(12) United States Patent
Eto et al.

(10) Patent No.: US 12,482,308 B2
(45) Date of Patent: Nov. 25, 2025

(54) CONTROLLER

(71) Applicant: TOYOTA JIDOSHA KABUSHIKI KAISHA, Toyota (JP)

(72) Inventors: Shingo Eto, Toyota (JP); Noritaka Takuda, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 154 days.

(21) Appl. No.: 18/381,198

(22) Filed: Oct. 18, 2023

(65) Prior Publication Data
US 2024/0161554 A1 May 16, 2024

(30) Foreign Application Priority Data

Nov. 15, 2022 (JP) ................................ 2022-182466

(51) Int. Cl.
*G07C 5/04* (2006.01)
*B60L 1/00* (2006.01)
*B60R 16/033* (2006.01)

(52) U.S. Cl.
CPC ............ *G07C 5/04* (2013.01); *B60L 1/003* (2013.01); *B60R 16/033* (2013.01)

(58) Field of Classification Search
CPC .......... G07C 5/04; B60L 1/003; B60R 16/033
See application file for complete search history.

(56) References Cited

U.S. PATENT DOCUMENTS

| | | | | |
|---|---|---|---|---|
| 2002/0062183 A1* | 5/2002 | Yamaguchi | ............ | B60K 6/543 903/905 |
| 2012/0109413 A1* | 5/2012 | Smith | ............ | B60W 40/10 701/1 |
| 2013/0253740 A1* | 9/2013 | Kim | ............ | B60L 58/12 701/123 |
| 2015/0367856 A1* | 12/2015 | Meyer | ............ | G07C 5/08 701/123 |
| 2016/0061610 A1* | 3/2016 | Meyer | ............ | B60L 58/12 701/22 |
| 2018/0118033 A1* | 5/2018 | Lu | ............ | B60L 3/12 |
| 2020/0313595 A1* | 10/2020 | Oguma | ............ | H02P 27/08 |
| 2022/0297571 A1* | 9/2022 | Oguma | ............ | B60L 7/14 |

FOREIGN PATENT DOCUMENTS

| | | |
|---|---|---|
| JP | 2004-201412 A | 7/2004 |
| JP | 2018-064329 A | 4/2018 |

\* cited by examiner

*Primary Examiner* — Jelani A Smith
*Assistant Examiner* — Alyssa Rorie
(74) *Attorney, Agent, or Firm* — Dinsmore & Shohl LLP

(57) ABSTRACT

The controller is installed in the vehicle along with the motor for driving, the auxiliary equipment, and the battery that supplies power to the motor and the auxiliary equipment. After the vehicle's system starts up, the controller is programmed to (A) calculate the power consumption of the auxiliary equipment using the power output from the battery; (B) estimate the auxiliary equipment electricity cost using the power consumption of the auxiliary equipment, the estimated driving time, and the estimated driving distance; and (C) predict the driving electricity cost for the estimated driving distance using the auxiliary electricity cost and the driving learning electricity cost from the learning results.

8 Claims, 2 Drawing Sheets

CONTROLLER

CROSS-REFERENCE TO RELATED APPLICATION

The present disclosure claims priority to Japanese Patent Application No. 2022-182466 filed on Nov. 15, 2022, which is incorporated herein by reference in its entirety including specification, drawings and claims.

TECHNICAL FIELD

The present disclosure relates to a controller, and in particular, to a controller that is installed in a motor vehicle together with a motor, auxiliary equipment, battery, and the like.

BACKGROUND

A controller of this type has been proposed that calculates the distance that can be traveled based on the vehicle's electricity cost and remaining battery capacity (see, for example, Patent Document 1). This controller calculates the electricity cost of the flat road using the value obtained by subtracting the resistance of the slope from the traveling resistance, and calculates the possible traveling distance on the flat road based on the electricity cost of the flat road and the remaining battery capacity. The controller then displays on the display the distance that can be traveled and the distance that can be traveled on a flat road.

CITATION LIST

Patent Literature

PTL 1: JP2018-064329

SUMMARY

The electricity cost of the vehicle is largely affected by the power consumption of the air conditioning system and auxiliary equipment supplied by the battery. In particular, the power consumption of the auxiliary equipment can vary greatly depending on the number of the auxiliary equipment being driven and the driving status of the auxiliary equipment being driven. Therefore, the electricity cost of the vehicle can be predicted more appropriately by more accurately calculating the power consumption of the auxiliary equipment.

The main purpose of the controller of the present disclosure is to more appropriately predict the driving electricity cost for the estimated driving distance.

In order to achieve the main object described above, the controller is implemented by aspects described below.

The controller of this disclosure is installed in a motor vehicle together with a motor for driving, auxiliary equipment, and a battery supplying power to the motor and the auxiliary equipment:
  wherein the controller is programmed to, at a startup of the motor vehicle,
    (A) calculate the power consumption of the auxiliary equipment using the power output from the battery;
    (B) estimate auxiliary equipment electricity cost using the power consumption of the auxiliary equipment, estimated driving time, and estimated driving distance; and
    (C) predict driving electricity cost for the estimated driving distance using the auxiliary electricity cost and driving learning electricity cost from learning results.

The controller of the present disclosure is installed in an automobile together with a motor for driving, auxiliary equipment, and a battery that supplies power to the motor, air conditioning system, and auxiliary equipment. At a startup of the motor vehicle, the controller calculates the power consumption of the auxiliary equipment using the power output from the battery. Next, the controller estimates the auxiliary equipment electric cost using the power consumption of the auxiliary equipment, the estimated driving time, and the estimated driving distance. Furthermore, the controller predicts the driving electricity cost for the estimated driving distance using the auxiliary electricity cost and the driving learning electricity cost from the learning results. In this way, the electricity cost of auxiliary equipment can be estimated more appropriately for the estimated driving electricity cost because the electricity cost of auxiliary equipment is estimated using the power consumption of auxiliary equipment after the motor vehicle's system startup. The driving learning electricity cost can be calculated by machine learning using the driving electricity cost calculated in the past, or by weighting the new driving electricity cost and the driving learning electricity cost resulting from the previous learning process. In this disclosure, "electricity cost" is defined to mean the amount of electricity used per unit distance traveled.

DESCRIPTION OF EMBODIMENTS

Figure 1:
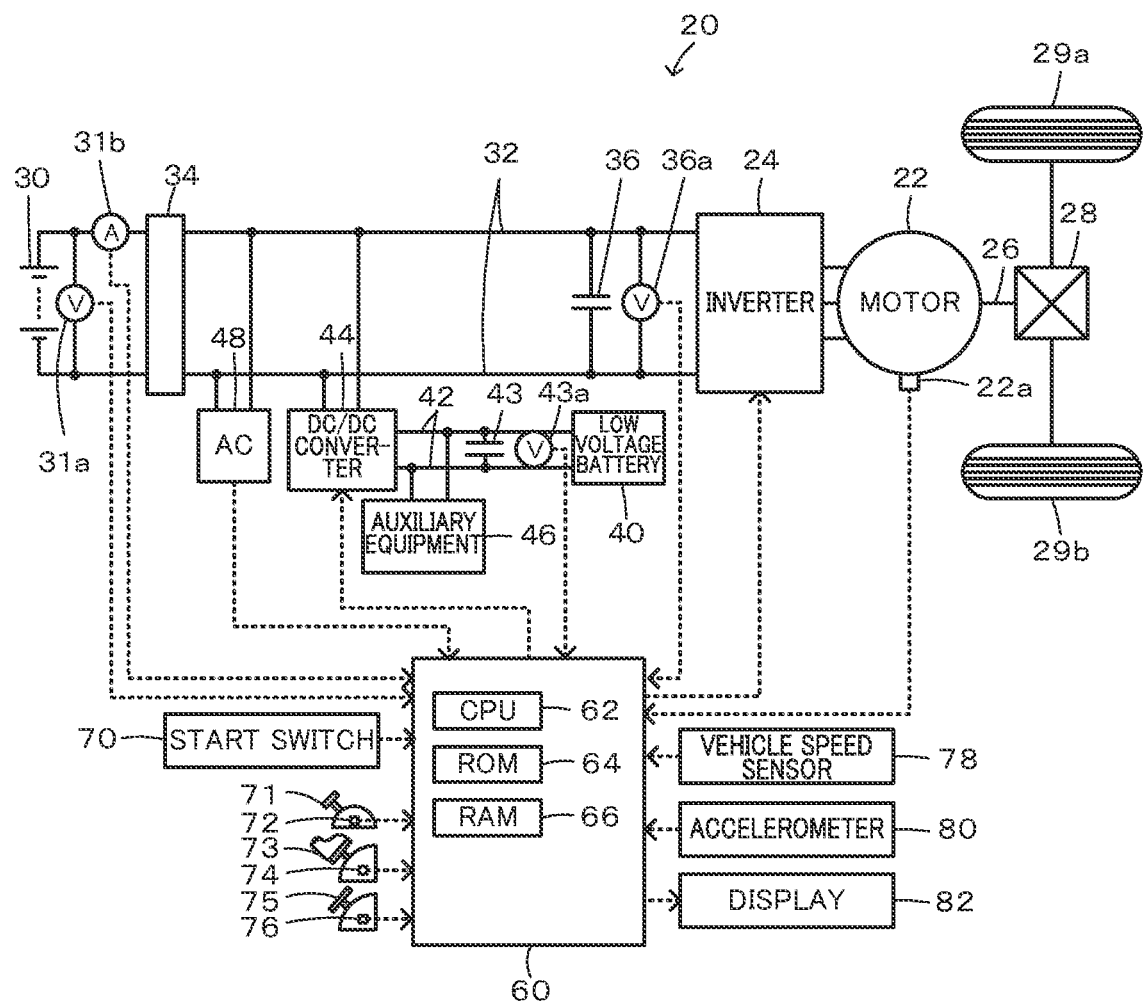
FIG. 1 is a schematic diagram of an electric vehicle equipped with a controller as an embodiment of the present disclosure.

Next, the form for implementing this disclosure (embodiment) will be described. FIG. 1 shows a schematic diagram of an electric vehicle 20 equipped with a controller as an embodiment of the present disclosure. As shown in FIG. 1, the electric vehicle 20 of the embodiment includes a motor 22, an inverter 24, a high voltage battery 30, a low voltage battery 40, a DC/DC converter 44, auxiliary equipment 46, an air conditioning system 48, and an electronic control unit 60. The electronic control unit 60 in the embodiment corresponds to the "controller".

The motor 22 is configured, for example, as a synchronous generator motor. The rotor (not shown) of motor 22 is connected to drive shaft 26, that is connected to the drive wheels 29a, 29b via differential gear 28. The motor 22 is equipped with a rotational position detection sensor 22a that detects the rotational position of the rotor.

The inverter 24 is composed as a well-known inverter circuit with six transistors and six diodes. The inverter 24 is connected to the high voltage system power line 32, which is connected to the high voltage battery 30. The inverter 24 converts DC power from the high voltage battery 30 to 3-phase AC through PWM control and applied to the motor 22 to drive the motor 22.

The high voltage battery 30 is composed of, for example, a lithium-ion battery. The high voltage battery 30 is connected to the high voltage system power line 32. The voltage sensor 31a, which detects the battery voltage Vb, is attached to both terminals of the high voltage battery 30. The current sensor 31b, which detects a battery current Ib, is attached to the terminals of the high voltage battery 30. The high voltage system power line 32 is fitted with the system main relay 34 that connects and disconnects the high voltage battery 30. The high voltage system power line 32 is also fitted with a smoothing capacitor 36. The high voltage system power line 32 is equipped with the voltage sensor 36a that detects the high voltage system voltage VH.

The low voltage battery 40 is composed of, for example, a lead-acid battery. The low voltage battery 40 is connected to the low voltage system power line 42. The auxiliary equipment 46 is attached to the low voltage system power line 42. Auxiliary equipment 46 can include wipers, lighting, seat heaters, steering wheel heaters, and so on. There is also the smoothing capacitor 43 attached to the low voltage system power line 42. There is the voltage sensor 43a attached to the low voltage system power line 42, which detects the low voltage system voltage VL.

The DC/DC converter 44 is connected to the high voltage system power line 32 and the low voltage system power line 42. The DC/DC converter 44 is constructed as a well-known DC/DC converter. DC/DC converter 44 supplies DC power from the high voltage system power line 32 to the low voltage system power line 42 by stepping down the DC power.

The electronic control unit 60 is constructed as a microcomputer with a CPU 62 as its core. The electronic control unit 60 includes the CPU 62 as well as ROM 64, RAM 66, flash memory (not shown), input ports (not shown), and output ports (not shown).

The electronic control unit 60 inputs the rotational position θ detected by the rotational position detection sensor 22a, the battery voltage Vb detected by the voltage sensor 31a, the battery current Ib detected by the current sensor 31b, the high voltage system voltage VH detected by the voltage sensor 36a, and the low voltage system voltage VL detected by the voltage sensor 43a, etc. via input ports. The electronic control unit 60 inputs a start signal ST from start switch 70, an accelerator opening Acc detected by an accelerator pedal position sensor 72 attached to an accelerator pedal 71, a brake pedal position BP detected by a brake pedal position sensor 74 attached to a brake pedal 73, and a shift position SP detected by a shift lever position sensor 76 attached to a shift lever 75. The electronic control unit 60 also inputs the vehicle speed V detected by a vehicle speed sensor 78 and an acceleration α detected by an accelerometer 80. The electronic control unit 60 also inputs a power consumption Wac of the air conditioning system 48.

The electronic control unit 60 outputs switching control signals to the inverter 24, drive control signals to the DC/DC converter 44, and display control signals to a display 82 via output ports.

The electronic control unit 60 calculates a rotation speed Nm of the motor 22 based on the rotational position θ of the rotor of the motor 22. The electronic control unit 60 calculates a storage ratio SOC of the high voltage battery based on the integrated value of the battery current Ib.

Figure 2:
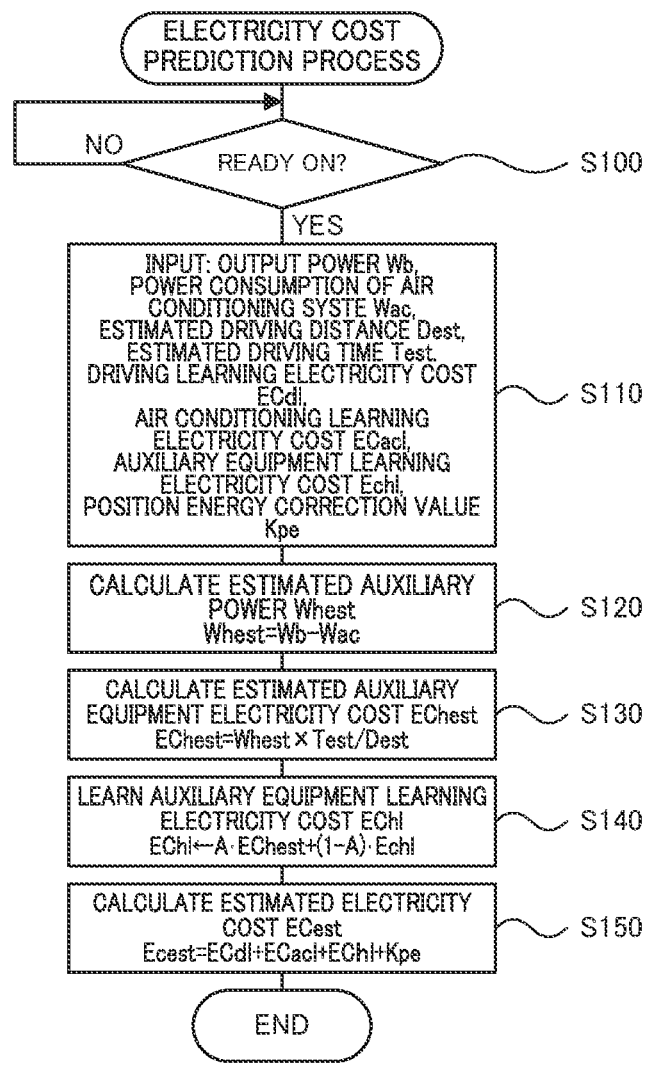
FIG. 2 is a flowchart of an example of the electricity cost prediction process performed by the electronic control unit 60 of the embodiment.

Next, the operation of the electric vehicle 20 of the embodiment, especially the operation of the electronic control unit 60 in predicting the electricity cost over the estimated driving distance, will be described. FIG. 2 shows a flowchart of an example of the electricity cost prediction process performed by the electronic control unit 60 of the embodiment. In the embodiment, "electricity cost" is assumed to mean the amount of electricity used per unit distance traveled.

In the electricity cost prediction process, the electronic control unit 60 first waits to be ready on (step S100). Upon ready-on, the electronic control unit 60 inputs the output power Wb from the high voltage battery 30, the power consumption Wac of the air conditioning system 48, the estimated driving time Test, the estimated driving distance Dest, the driving learning electricity cost ECd1, the air conditioning learning electricity cost ECac1, the auxiliary equipment learning electricity cost ECh1, and the position energy correction value Kpe (Step S110). The output power Wb from the high voltage battery 30 can be determined by the product of the battery voltage Vb detected by the voltage sensor 31a and the battery current Ib detected by the current sensor 31b. The estimated driving distance Dest is the distance that can be traveled, which is estimated based on the remaining capacity (storage ratio SOC) of the high voltage battery 30. The estimated driving time Test is the time required for driving the estimated driving distance Dest. The driving learning electricity cost ECd1 is the learning result calculated using the driving electricity cost ECd by the driving electricity cost learning process (not shown in the figure). The driving learning electricity cost ECd1 can be calculated by machine learning using the driving electricity cost ECd calculated in the past, or by weighting the new driving electricity cost ECd and the driving learning electricity cost ECd1 resulting from the previous learning process. The air conditioning learning electricity cost ECac1 is a learning result calculated using the electricity cost ECac of the air conditioning system 48 by an air conditioning electricity cost learning process (not shown). The air conditioning learning electricity cost ECac1 can be calculated by machine learning using the previously calculated air conditioning electricity cost ECac, or by weighting the new air conditioning electricity cost ECac and the air conditioning learning electricity cost ECac1 from the previous learning results. The auxiliary equipment learning electricity cost ECh1 is the result of learning the electricity cost ECh of the auxiliary equipment 46, which is calculated by this process. The position energy correction value Kpe is an integrated value of the change in the position energy of the vehicle calculated based on the vehicle speed V, the acceleration α, and the motor torque Tm. Therefore, the position energy correction value Kpe is the value 0 when the elevation of the departure point and the destination point are the same.

Next, the electronic control unit 60 calculates the power consumption of the auxiliary equipment 46 (the estimated auxiliary power Whest) (step S120). The estimated auxiliary power Whest can be calculated by subtracting the power consumption Wac of the air conditioning system 48 from the output power Wb of the high voltage battery 30.

The electronic control unit 60 then calculates the electricity cost of the auxiliary equipment 46 (the estimated auxiliary equipment electricity cost EChest) (step S130). The estimated auxiliary power cost ECest can be calculated by multiplying the estimated auxiliary power Whest by the estimated driving time Test and dividing by the estimated driving distance Dest.

Once the estimated auxiliary electricity cost ECest is calculated, the electronic control unit 60 learns the auxiliary equipment learning electricity cost ECh1 (step S140). The auxiliary equipment learning electricity cost ECh1 can be calculated, for example, as the sum of the weight A multiplied by the estimated auxiliary equipment electricity cost EChest and the auxiliary equipment learning electricity cost ECh1 up to now multiplied by (1−A). The auxiliary equipment learning electricity cost ECh1 may be calculated by machine learning using the auxiliary equipment electricity cost ECh calculated in the past.

Next, the electronic control unit 60 calculates the estimated electricity cost ECest for the estimated driving distance Dest (step S150). The estimated electricity cost ECest can be calculated as the sum of the driving learning electricity cost ECd1, the air conditioning learning electricity cost ECac1, the auxiliary equipment learning electricity cost ECh1, and the position energy correction value Kpe. The estimated electricity cost ECest is displayed on the display 82.

The electronic control unit 60 installed in the electric vehicle 20 of the embodiment described above calculates the estimated auxiliary power Whest as well as the estimated auxiliary equipment power cost EChest after the ready-on. The electronic control unit 60 then calculates the estimated electricity cost ECest using the estimated auxiliary equipment electricity cost EChest and the driving learning electricity cost ECd1. By calculating the estimated auxiliary equipment power Whest when the system is readyon, the estimated auxiliary equipment power Whest can be calculated more appropriately and the estimated auxiliary equipment power cost EChest can also be calculated. As a result, the estimated electricity cost ECest for the estimated driving electricity cost Dest can be estimated more appropriately.

The electronic control unit 60 installed by the electric vehicle 20 of the embodiment learns the auxiliary equipment learning electricity cost ECh1 using the estimated auxiliary equipment electricity cost EChest. The electronic control unit 60 then calculates the estimated electricity cost ECest as the sum of the driving learning electricity cost ECd1, the air conditioning learning electricity cost ECac1, the auxiliary equipment learning electricity cost ECh1, and the position energy correction value Kpe. As a result, the estimated electricity cost ECest for the estimated driving electricity cost Dest can be estimated more appropriately.

In the electronic control unit 60 installed in the electric vehicle 20 of the embodiment, the estimated electricity cost ECest is calculated by adding the driving learning electricity cost ECd1, the air conditioning learning electricity cost ECac1, the auxiliary equipment learning electricity cost ECh1, and the position energy correction value Kpe. However, the electronic control unit 60 may calculate the estimated electricity cost ECest by using the estimated auxiliary equipment electricity cost ECest instead of the auxiliary equipment learning electricity cost ECh1.

In the electronic control unit 60 installed by the electric vehicle 20 of the embodiment, the estimated electricity cost ECest is displayed on the display 82. However, in addition to the estimated electricity cost ECest, the driving learning electricity cost ECd1, the air conditioning learning electricity cost ECac1, and the auxiliary equipment learning electricity cost ECh1 may also be displayed on the display 82.

The electronic control unit 60 installed by the electric vehicle 20 of the embodiment calculates the estimated auxiliary equipment power Whest by subtracting the power consumption Wac of the air conditioning system 48 from the output power Wb from the high voltage battery 30 when the vehicle is in ready-on state. However, when the electric vehicle 20 has an engine and a generator that generates electricity using the power output by the engine, and the engine is started when it is in ready-on, the estimated auxiliary equipment power Whest may be calculated as follows. The estimated auxiliary equipment power Whest may be calculated by subtracting the power consumption Wac of the air conditioning system 48 and the power generated by the generator from the output power Wb of the high voltage battery 30.

The electric vehicle 20 in the embodiment is equipped with the air conditioning system 48, and the estimated auxiliary equipment power Whest is calculated using also the power consumption Wac of the air conditioning system 48, and the estimated electricity cost ECest is calculated using also the air conditioning learning electricity cost ECac1. However, the estimated auxiliary equipment power Whest and the estimated electricity cost ECest may be calculated without considering the power consumption of the air conditioning system 48 or the air conditioning learning electricity cost ECac1.

In the controller of the present disclosure, the vehicle may be equipped with an air conditioning system that receives power supply from the battery, and the controller may be programmed to calculate the power consumption of the auxiliary equipment using the power output from the battery and the power consumption of the air conditioning system. For vehicles equipped with an air conditioning system, the power consumption of auxiliary equipment can be calculated more appropriately by considering the power consumption of the air conditioning system, and the driving electricity cost for the estimated driving distance can be estimated more appropriately.

In the controller of the present disclosure, the motor vehicle may be equipped with an engine and a generator that uses power of the engine to generate electricity, and the controller may be programmed to calculate the power consumption of the auxiliary equipment using the power output from the battery, and the power generated by the generator, in the case of starting the engine at the startup of the motor vehicle. In this way, the auxiliary equipment power consumption can be calculated more appropriately even when the engine is started at the startup of the motor vehicle system. In some embodiments, for vehicles equipped with the air conditioning system, the auxiliary equipment power consumption may be calculated using the power consumption of the air conditioning system as well.

In the controller of the present disclosure, the controller may be programmed to predict the driving electricity cost for the estimated driving distance using the driving learning electricity cost, auxiliary equipment learning electricity cost from the learning results, and the position energy correction value. In this way, the estimated electricity cost for the estimated driving distance can be predicted more appropriately using the learning results. The auxiliary equipment learning electricity cost can be calculated by machine learning using the auxiliary equipment electricity cost calculated in the past, or by weighting the new auxiliary equipment electricity cost and the auxiliary equipment learning electricity cost resulting from the previous learning results. The position energy correction value can be obtained by adding up the change in the vehicle's position energy, which is calculated based on the vehicle speed, the acceleration, and the motor torque. In some embodiments, for vehicles equipped with an air conditioning system, the air conditioning learning electricity cost from the learning results may also be used to estimate the driving electricity cost for the estimated driving distance. The air conditioning learning electricity cost can be calculated by machine learning using the air conditioning electricity cost calculated in the past, or by weighting the new air conditioning electricity cost and the air conditioning learning electricity cost resulting from previous learning.

The following is an explanation of the correspondence between the main elements of the embodiment and the main elements of the disclosure described in the Summary section. In the embodiment, motor 22 corresponds to "motor", air conditioning system 48 corresponds to "air conditioning system", auxiliary equipment 46 corresponds to "auxiliary equipment", high voltage battery 30 corresponds to "battery", and electronic control unit 60 corresponds to "controller".

The correspondence between the major elements of the embodiment and the major elements of the disclosure described in the Summary section is an example of how the embodiment can be used to specifically explain the embodiment of the disclosure described in the Summary section. This does not limit the elements of the disclosure described in the Summary section. In other words, interpretation of the disclosure described in the Summary section should be based on the description in that section, and the embodiment is only one specific example of the disclosure described in the Summary section.

The above is a description of the form for implementing this disclosure using the embodiment. However, the present disclosure is not limited in any way to these embodiments, and can of course be implemented in various forms within the scope that does not depart from the gist of the present disclosure.

INDUSTRIAL APPLICABILITY

This disclosure is applicable to the manufacturing industry for controllers installed in motor vehicles and other applications.

What is claimed is:

1. A controller installed in a motor vehicle together with a motor for driving, auxiliary equipment, and a battery supplying power to the motor and the auxiliary equipment, the controller is programmed to, in response to a startup of the motor vehicle,
    calculate power consumption of the auxiliary equipment using the power output from the battery;
    estimate auxiliary equipment electricity cost using the power consumption of the auxiliary equipment, estimated driving time, and estimated driving distance;
    predict driving electricity cost for the estimated driving distance using the auxiliary electricity cost and driving learning electricity cost from learning results;
    input a plurality of parameters including a start signal from a start switch;
    output one or more control signals based on the plurality of parameters; and
    drive the motor in accordance with the one or more control signals that generates the estimated driving time and the estimated driving distance.

2. The controller according to claim 1,
    wherein the motor vehicle is equipped with an air conditioning system that receives power supply from the battery; and
    wherein the controller is programmed to calculate the power consumption of the auxiliary equipment using the power output from the battery and the power consumption of the air conditioning system.

3. The controller according to claim 1,
    wherein the motor vehicle is equipped with an engine and a generator that uses power of the engine to generate electricity; and
    wherein the controller is programmed to calculate the power consumption of the auxiliary equipment using the power output from the battery, and the power generated by the generator, in the case of starting the engine at the startup of the motor vehicle.

4. The controller according to claim 1, wherein the controller is programmed to predict the driving electricity cost for the estimated driving distance using the driving learning electricity cost, auxiliary equipment learning electricity cost from the learning results, and a position energy correction value.

5. The controller according to claim 1, wherein the plurality of parameters comprise a rotational position, a battery voltage, a battery current, a first system voltage, a second system voltage, an accelerator opening that are inputted via one or more input ports, a brake pedal position, a shift position, and a power consumption of an air conditioning system.

6. The controller according to claim 1, wherein the one or more control signals comprise a switching control signal output to an inverter, a drive control signal output to a converter, and a display control signal output to a display via one or more output ports.

7. The controller according to claim 1, wherein the controller is programmed to estimate the driving distance based on a remaining capacity of the battery.

8. The controller according to claim 1, wherein the controller is programmed to calculate the driving electricity cost by machine learning using past driving electricity cost or by weighting new driving electricity cost and the driving electricity cost resulting from one or more previous machine learning processes.

* * * * *